L. JACOBS.
AUTOMATIC WEIGHING MACHINE.
APPLICATION FILED DEC. 28, 1910.
993,069.
Patented May 23, 1911.
2 SHEETS—SHEET 1.
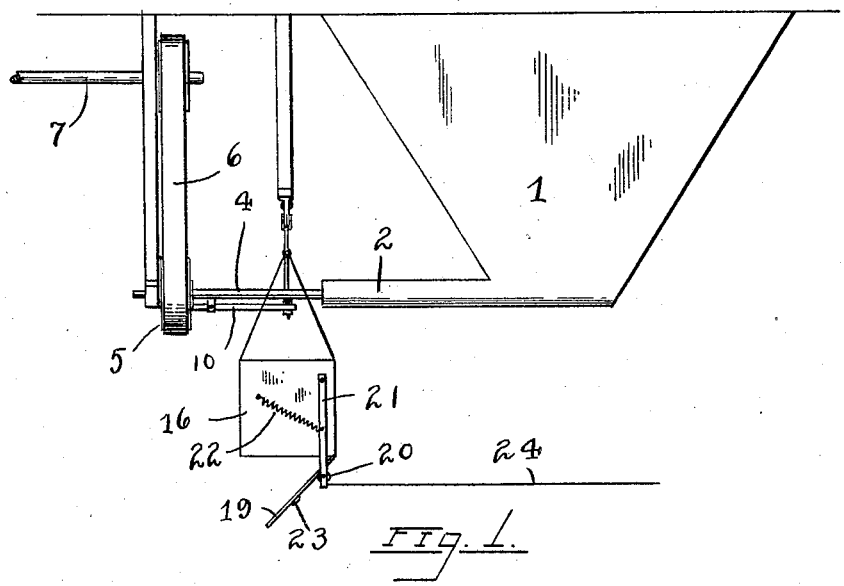
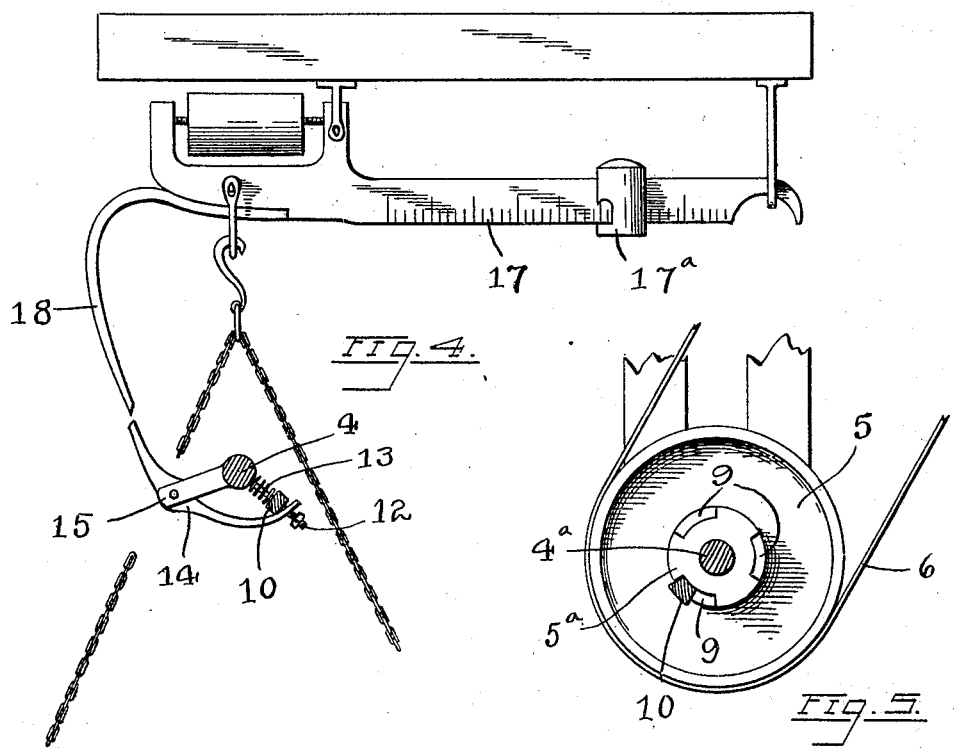
Witnesses
Inventor
LEO JACOBS:
BY Luther V. Moulton
Attorney L. JACOBS.
AUTOMATIC WEIGHING MACHINE.
APPLICATION FILED DEC. 28, 1910.
993,069.
Patented May 23, 1911.
2 SHEETS—SHEET 2.
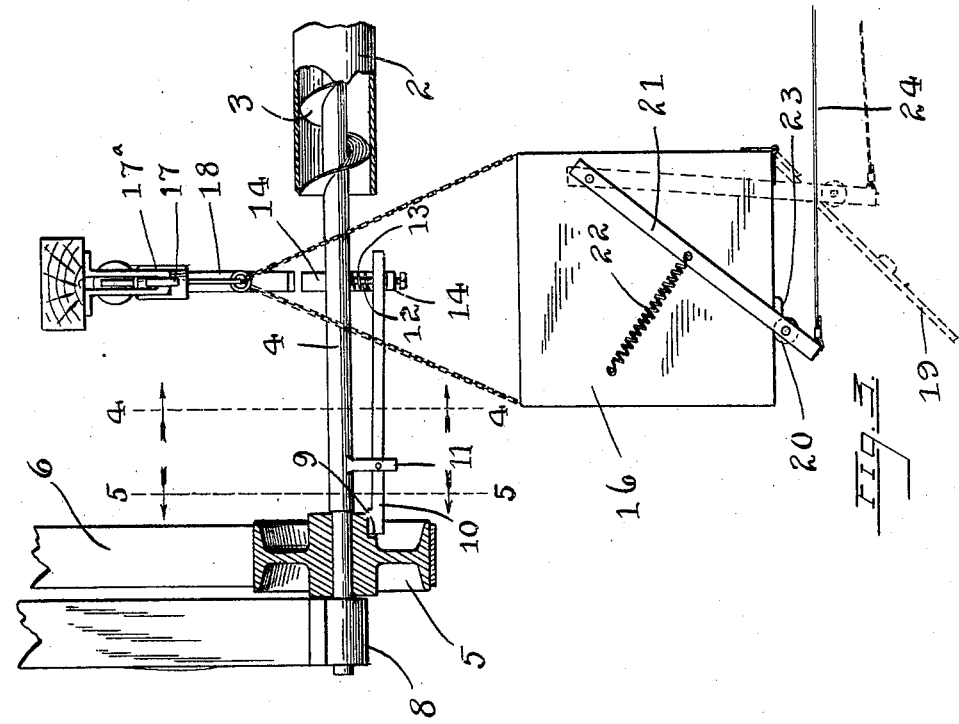
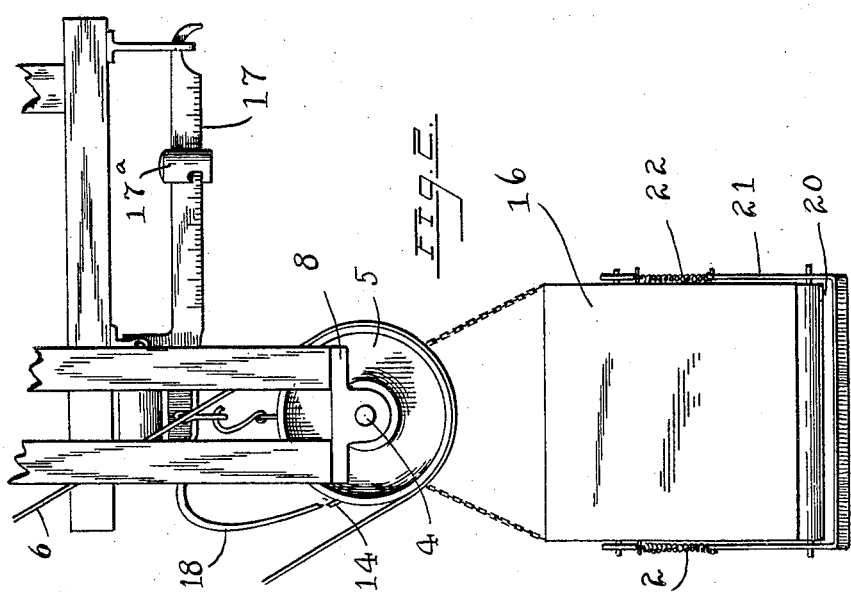
Witnesses
Harold O. Van Antwerp
Anna De Windt
Inventor
LEO JACOBS.
By Luther V. Moulton
Attorney

UNITED STATES PATENT OFFICE.

LEO JACOBS, OF ST. LOUIS, MISSOURI, ASSIGNOR TO ACME CEMENT PLASTER COMPANY, OF ST. LOUIS, MISSOURI, A CORPORATION OF ILLINOIS.

AUTOMATIC WEIGHING-MACHINE.

993,069.  Specification of Letters Patent.  Patented May 23, 1911.

Application filed December 28, 1910. Serial No. 599,667.

*To all whom it may concern:*

Be it known that I, LEO JACOBS, citizen of the United States of America, residing at St. Louis, in the State of Missouri, have invented certain new and useful Improvements in Automatic Weighing - Machines; and I do hereby declare the following to be a full, clear, and exact description of the invention, such as will enable others skilled in the art to which it appertains to make and use the same.

My invention relates to improvements in automatic weighing machines and its object is to provide a device which will remove a predetermined weight of material from a hopper depositing it within a receptacle, the emptying of such receptacle causing it to automatically repeat the operation, and to provide the device with various new and useful features as hereinafter more fully described and particularly pointed out in the claims reference being had to the accompanying drawing in which;

Figure 1 is a diagrammatic elevation of a device embodying my invention; Fig. 2 is an enlarged side elevation of a portion of the device. Fig. 3 is an elevation of the same at right angles to Fig. 2 with parts broken away; Fig. 4 a section on the line 4—4 of Fig. 3 showing the beam in side elevation; and, Fig. 5 is an enlarged section on the line 5—5 of Fig. 3.

Like numbers refer to like parts in all of the figures.

The material to be weighed is placed in a hopper 1 which has a horizontal tubular outlet 2 at the bottom. A spiral conveyer 3 carried on a shaft 4 is located in this outlet tube 2 and rotative therein. The inner end of the shaft 4 is within the hopper while its outer end extends beyond the conveyer and is journaled in a bearing 8 which is supported in any convenient way. The outer end of the shaft 4 carries a pulley 5 freely rotative on the shaft. An overhead shaft 7 drives the pulley 5 by a belt 6.

The hub 5ᵃ of the pulley 5 is provided with recesses 9 in its periphery. A clutch lever 10 is arranged substantially parallel with the shaft 4, and is pivoted to a projection 11 on the shaft and rotates with the shaft. The end of the lever adjacent to the pulley 5 overlaps the hub 5ᵃ and is normally held within one of the recesses 9 by a spring 13 which forces the opposite end of the lever away from the shaft. This opposite end of the lever is prevented from lateral movement by a guide pin 12, projecting from the shaft which pin extends through a slot in the lever.

It will be seen that when the end of the lever 10 is within one of the recesses 9 in the hub 5ᵃ of the pulley 5 the lever will operate as a clutch member connecting the pulley and shaft 4. This will actuate the conveyer 3 removing material from the hopper 1 and depositing it in a receptacle 16 which hangs under the opening in the tube 2 and is suspended from a scale beam 17. After a certain weight of material determined by the position of the weight 17ᵃ on the beam 11, has been deposited within the receptacle 16 the end of the beam 17 carrying the weight will rise allowing the receptacle 16 to descend. The end of the scalebeam carrying the receptacle is provided with a downwardly extended arm 18 which is also lowered within the path of a trip lever 14. This lever is arranged at right angles to the shaft 4 near the end of the lever 10, opposite to the end engaging this hub being pivoted near its center in an arm 15, which arm extends radially from the shaft. One end of this lever 14 overlaps the said end of the lever 10 being also guided by the pin 12 extending through an opening therein. The opposite end of this lever is normally free and the whole rotates with the shaft.

As the receptacle 16 is lowered by the weight of material deposited therein the arm 18 is lowered, and the lower end of this arm will engage the free end of the trip lever 14 forcing the lever 10 toward the shaft and disengaging its opposite end from the hub 5ᵃ of the pulley. This frees the shaft 4 which stops its rotation and the pulley 5 rotates freely on the same. This will continue as long as the proper weight of material is in the receptacle 16. This receptacle is provided with a hinged bottom 19 which is adapted to be manually dropped to suddenly empty the receptacle. The bottom is held normally closed by a roller 20 which engages it and extends transversely beneath the same. This roller is mounted in a stirrup 21 which extends upward and is pivotedly attached near the rear of the receptacle and is normally held in a position to close the bottom by springs 22 and in this position the roller 20 will engage the hinged bottom 19 holding it closed. A stop 23 attached to the under side of the bottom 19 aids in holding the bottom closed by preventing the roller from being easily moved backward. To drop the bottom 19 the lower end of the stirrup is swung backward by means of a cable 24 attached thereto and adapted to be manually operated. This movement of the stirrup 21 moves the roller 20 past the stop 23 and lowers it releasing the bottom 19 which drops allowing the material within the receptacle to fall by gravity into any convenient receptacle arranged to receive it. As soon as the receptacle 16 is emptied the cable 24 is released, whereupon the lower end of the stirrup 21 carrying the roller 20 moves forward and upward by means of the springs 22, the roller traversing the under side of the hinged bottom and passing over the stop 23, closes the bottom and holds it closed. As soon as the receptacle 16, is relieved of its contents the counter weight 17$^a$ will cause the end of the beam carrying the same to fall thus carrying the arm 18 upward and freeing the trip lever 14. The spring 13 will now reëngage the lever 10 with one of the recesses in the hub of the pulley 5, whereupon the shaft will be rotated and the operation of the device will be repeated.

What I claim is:—

1. A weighing machine, comprising a conveyer shaft, a conveyer fixed on the shaft, a driving pulley loose on the shaft, a clutch member mounted on the shaft to engage the pulley, a trip lever mounted on the shaft to disengage the clutch member from the pulley, a receptacle beneath the conveyer, a scale beam supporting the receptacle, and an arm on the scale beam to engage the trip lever and stop the conveyer.

2. A weighing machine comprising a conveyer, a conveyer shaft, a driving pulley loose on the shaft, recesses in the hub of the driving pulley, a clutch lever pivoted on the shaft having one end adapted to engage a recess in the hub to drive the shaft, a trip lever pivoted on the shaft and arranged to engage the free end of the clutch lever, a movable weighing receptacle means for emptying the weighing receptacle and an arm operated by the movement of the weighing receptacle to engage the trip lever to disengage the clutch lever from the driving pulley.

3. A weighing machine comprising a helical conveyer, a shaft to drive the conveyer, a driving pulley loose on the shaft, a scale beam, a weighing receptacle beneath the spout of the conveyer suspended from the scale beam and movable therewith, a clutch lever extending longitudinally of the shaft to engage the pulley, a trip lever extending transversely of the shaft to disengage the clutch lever from the pulley, and an arm on the scale beam to engage and operate the trip lever.

4. A weighing machine comprising a conveyer, a conveyer shaft, a driving pulley loose on the shaft, recesses in the hub of the driving pulley, a clutch lever parallel to the shaft and pivotally connected thereto, one end of said lever engaging a recess in the hub of the driving pulley a guide pin for the other end of said lever, a spring to engage the clutch lever with the driving pulley, a trip lever transversely arranged and pivoted to the shaft near the other end of the clutch lever and adapted to move the clutch lever to disengage it from the driving pulley, a scale beam, a weighing receptacle beneath the spout of the conveyer suspended from the scale beam and vertically movable therewith, means for emptying the weighing receptacle and a downwardly extending arm on the scale beam to engage the trip lever and operate the same.

5. A weighing machine comprising a conveyer, a conveyer shaft, a driving pulley loose on the shaft, a movable weighing receptacle, means operated by the movement of the receptacle to alternately connect and disconnect the driving pulley with the shaft, a hinged bottom to the weighing receptacle, a stirrup extending beneath the bottom and pivoted to the sides of the receptacle and springs to normally hold the stirrup in a position to close the bottom of the receptacle.

6. A weighing machine comprising a conveyer, a conveyer shaft, a driving pulley loose on the shaft, a movable receptacle, means operated by movement of the weighing receptacle to alternately connect and disconnect the driving pulley with the conveyer shaft, a hinged bottom to the weighing receptacle, a stirrup extending beneath the bottom and pivoted to the sides of the receptacle, a roller journaled in the stirrup to support the bottom, a stop attached to the bottom engaging the roller to aid in holding the bottom closed, springs to normally hold the stirrup in a position to close the bottom of the receptacle, and a cable attached to the lower part of the stirrup to swing the same backward and downward to release the bottom of the receptacle.

7. A weighing machine comprising a conveyer, a conveyer shaft, a drive pulley loose on the shaft, recesses in the hub of the drive pulley, a clutch lever parallel to the shaft and pivotally connected thereto one end of said lever engaging a recess in the hub of the drive pulley a guide pin on which the other end of the lever is slidable, a spring to engage the clutch lever with the drive pulley, a trip lever transversely arranged and pivoted to the shaft near the end of the clutch lever and adapted to move the clutch lever to disengage it from the drive pulley, a scale beam, a weighing receptacle beneath the spout of the conveyer, suspended from the scale beam and vertically movable therewith, a downwardly extending arm on the scale beam to engage the trip lever and operate the same, a hinged bottom in the weighing receptacle, a stirrup extending beneath the bottom and pivoted to the sides of the receptacle, a roller journaled in the stirrup to support the bottom, a stop attached to the bottom engaging the roller to aid in holding the bottom closed, springs to normally hold the stirrup in a position to close the bottom of the receptacle, and a cable attached to the lower part of the stirrup to swing the same backward and downward to release the bottom of the receptacle.

In testimony whereof I affix my signature in presence of two witnesses.

LEO JACOBS.

Witnesses:
E. H. WESCHER,
JAS. D. FIDLER.

Copies of this patent may be obtained for five cents each, by addressing the "Commissioner of Patents, Washington, D. C."